US010447545B1

(12) United States Patent
Billor et al.

(10) Patent No.: US 10,447,545 B1
(45) Date of Patent: Oct. 15, 2019

(54) COMMUNICATION PORT IDENTIFICATION

(71) Applicant: Amazon Technologies, Inc., Seattle, WA (US)

(72) Inventors: Denizcan Billor, Seattle, WA (US); Alaa Adel Mahdi Hayder, Seattle, WA (US); Daril Alexandre Vilhena, Seattle, WA (US); Rohit Sivaprasad, Seattle, WA (US); Yi Chen, Kent, WA (US)

(73) Assignee: Amazon Technologies, Inc., Seattle, WA (US)

( * ) Notice: Subject to any disclaimer, the term of this patent is extended or adjusted under 35 U.S.C. 154(b) by 438 days.

(21) Appl. No.: 14/581,801

(22) Filed: Dec. 23, 2014

(51) Int. Cl.
| | |
|---|---|
| *H04L 12/24* | (2006.01) |
| *H04J 14/02* | (2006.01) |
| *G06F 15/16* | (2006.01) |
| *G06F 13/36* | (2006.01) |
| *G06F 15/173* | (2006.01) |

(52) U.S. Cl.
CPC .......... *H04L 41/12* (2013.01); *H04J 14/0267* (2013.01); *G06F 13/36* (2013.01); *G06F 15/16* (2013.01); *G06F 15/173* (2013.01)

(58) Field of Classification Search
CPC ..... H04L 9/00; H04L 9/3297; H04L 12/2684; G06F 13/36; G06F 15/16; G06F 15/173
USPC ......................................................... 710/18
See application file for complete search history.

(56) References Cited

U.S. PATENT DOCUMENTS

| | | | | |
|---|---|---|---|---|
| 7,540,029 | B1* | 5/2009 | Saxena | H04L 43/067 726/23 |
| 9,170,625 | B1* | 10/2015 | Gettings | G05B 15/02 |
| 2004/0013119 | A1* | 1/2004 | MeLampy | H04L 29/06 370/395.21 |
| 2008/0084898 | A1* | 4/2008 | Miyaho | H04L 47/10 370/498 |
| 2010/0023629 | A1* | 1/2010 | Lennaerta | H04L 29/12367 709/228 |
| 2010/0125661 | A1* | 5/2010 | Perala | H04L 43/0852 709/224 |
| 2013/0080639 | A1* | 3/2013 | Chang | H04L 45/64 709/226 |
| 2013/0343614 | A1* | 12/2013 | Kyal | G06K 9/0057 382/107 |
| 2015/0312112 | A1* | 10/2015 | Sung | H04L 41/32 715/736 |
| 2016/0174085 | A1* | 6/2016 | Sung | H04W 24/06 370/252 |

* cited by examiner

*Primary Examiner* — Getente A Yimer
(74) *Attorney, Agent, or Firm* — BakerHostetler

(57) ABSTRACT

A system adapted to identify a router port corresponding to a DWDM device port is disclosed. A port identification server gathers and accumulates time series traffic data for a port of a DWDM device and plurality of router ports. The port identification server compares the time series traffic data for the port of the DWDM device with the time series data for router ports in order to determine which one of the router ports has data transmitted therefrom and received thereat that best fits or corresponds to the data received at and sent from the DWDM port. The port identification server identifies the router port that has time series data traffic that most closely matches the data traffic at the DWDM port as connected to the DWDM port.

20 Claims, 7 Drawing Sheets

COMMUNICATION PORT IDENTIFICATION

BACKGROUND

Computer networks are implemented using networking equipment such as, for example, optical networking ports, routers, and switches that are communicatively coupled with each other, often via physical media such as fiber optic cables. For example, a network may be implemented, in part, by coupling input/output ports of optical networking ports with router ports.

As the size of computer networks has expanded, the number of networking devices needed to implement those networks has increased and the interconnections between networking devices has become more complex. In the case of computer data centers which often comprise scores of computing resources, a high density of networking equipment and a complicated series of cable connections is often required to interconnect the numerous computing resources.

BRIEF DESCRIPTION OF DRAWINGS

The following description of the illustrative embodiments may be better understood when read in conjunction with the appended drawings. It is understood that potential embodiments of the disclosed systems and methods are not limited to those depicted.

DETAILED DESCRIPTION

Figure 1:
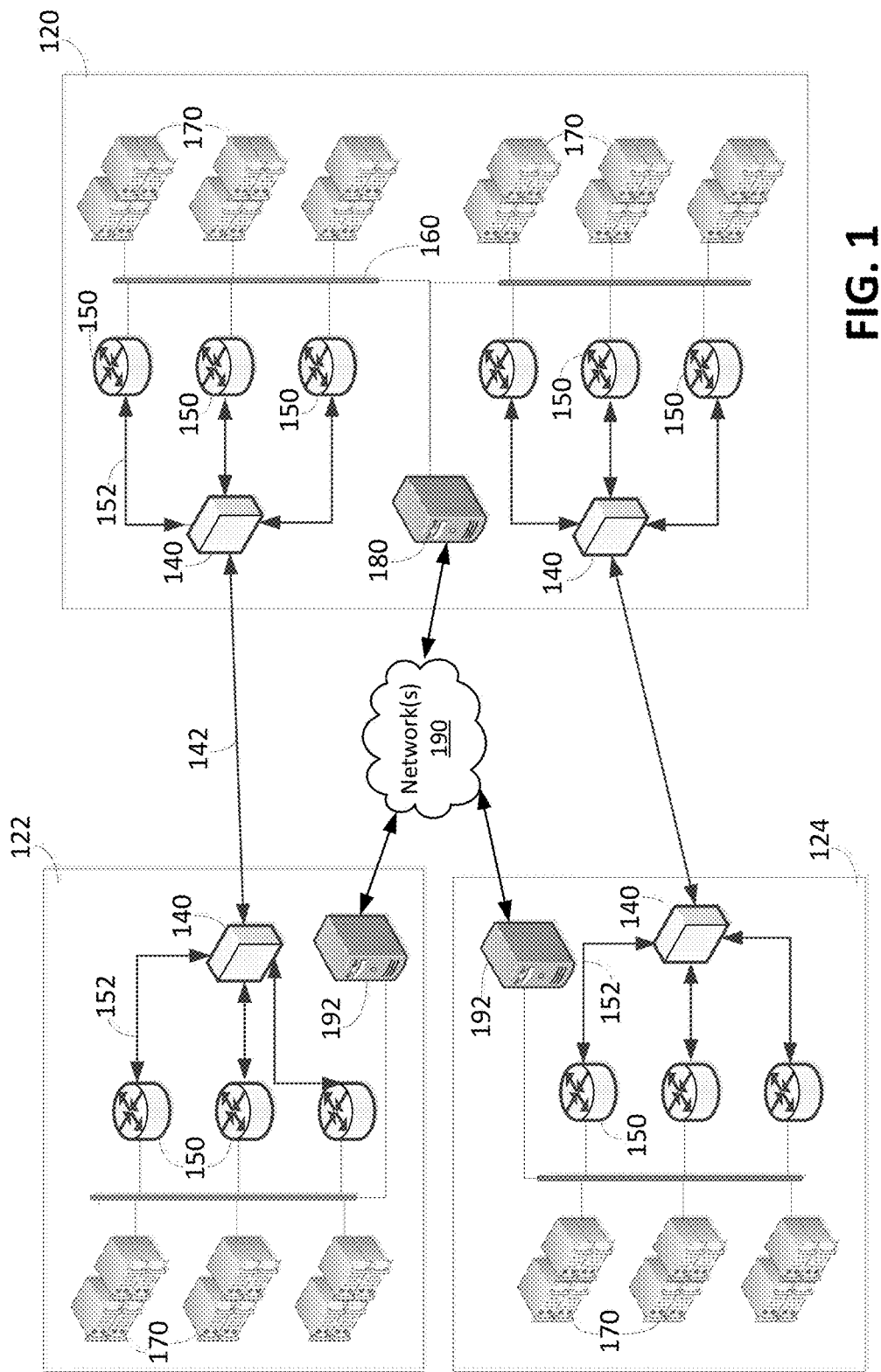
FIG. 1 depicts an example computer networking device architecture.

The large number of networking devices and the corresponding complex interconnections between networking devices has made the task of managing networks more difficult. Even the task of maintaining records of the networking equipment and the interconnections between networking devices becomes burdensome in settings where there are a large number of networking equipment that are connected to each other using physical media such as cables. This is especially true in networking embodiments where the network employs optical networking gear. For connections between Open Systems Interconnection (OSI) layer 1 optical networking devices such as, for example, dense wavelength divided multiplexing (DWDM) devices and layer 2 networking devices such as, for example, routers, there is no automated process to determine which router port is connected to which DWDM port. Layer 1 networking devices such as DWDM devices typically lack the ability to query layer 2 devices for identifying port information such as MAC addresses.

Some have proposed that for DWDM devices, one mechanism to identify port connectivity is to power off at a router port and observe which DWDM port alarms to indicate a signal loss. But most networks require high levels of system availability; a procedure that involves turning off connectivity is not acceptable.

Network management personnel have resorted to manually maintaining records that record interconnections between layer 1 optical networking equipment such as DWDM devices and layer 2 networking devices such as routers. For example, network management personnel may maintain a spreadsheet or a database system comprising records in which is recorded the particular ports of particular equipment that are connected to each other. In an example scenario, the spreadsheet may contain an entry identifying a particular port of a DWDM device is connected to a particular port of a particular layer 2 router. As new networking devices are added and connections between devices are added, deleted, or changed, the spreadsheet or database is manually updated to reflect the changes. The records of interconnections between networking equipment are used for numerous different purposes including, for example, to provide a history of the state of the networking equipment at particular points in time. The records provide a type of change control recording to show the configuration of the network as it evolved over time.

Manually maintained records are subject to human error, however. For example, a network engineer may forget to update records to reflect that a particular router has been added to the network and that particular ports of the router have been connected to particular ports of a DWDM devices. Alternatively, the network engineer may update the records, but may enter the incorrect port information into the records.

Disclosed herein are systems and computer-implemented methods for identifying connections between ports of networking equipment. The disclosed systems and methods compare performance data for a time period associated with a first port with performance data for a time period associated with each of a plurality of other ports. By comparing the performance data at the various ports, the disclosed systems and methods identify the ports that are connected to each other. In an example embodiment, systems and methods compare data sent from and received over time at a first port with data received at and sent over time from each port of other networking devices. The port that has inputs and outputs over time that most closely match or correspond to the outputs and inputs over time of the first port is identified as the port to which the first port is connected.

In an example embodiment, time series data corresponding to data received at and transmitted over time from each port of a plurality of networking device is collected. Networking equipment such as, for example, optical DWDM devices and layer 2 routers typically record information relating to the operations of the particular device. For example, data such as the traffic received into a port (bytes of data that are received over time) and traffic transmitted out of a port (bytes of data transmitted over time) may be recorded by the individual networking devices. In an example embodiment, a computer server, which may be referred to as a port identification server, gathers and accumulates over time the recorded time series data for ports of optical networking devices such as DWDM devices, ports of routers, and ports of any other devices to which the DWDM ports may be connected.

The port identification server prepares the accumulated time series send/receive data for comparison. For example, the server, where necessary, may convert the accumulated data to a standard time frame so that the data from different networking devices, which may have used different time standards, may be compared. Similarly, where the different networking devices collected data at different rates, the port identification server may sample the data so as to account for the different collection rates. The port identification server may store the prepared data items in data structures such as, for example, arrays so as to facilitate comparison of the data from the different ports.

The port identification server compares the prepared data for one of the ports of one of the DWDM devices with the prepared data for ports of router devices in order to determine which of the router ports best fits or corresponds to the data received at and sent from the DWDM port. In an example embodiment, the port identification server may first compare or evaluate the data sent over time from the DWDM port and data received over time at the various router ports. The port identification server generates for each router port an identification of the closeness of fit or matching between the data sent over time from the DWDM port and the data received over time at the particular router port. In an example embodiment, the port identification server may perform a regression analysis for each router port between the data transmitted from the DWDM port over time and the data received over time by the particular router port.

The port identification server may also evaluate or compare the data received over time at the DWDM port with data transmitted over time from the various router ports. The port identification server generates for each router port an identification of the closeness of fit or matching between the data received over time at the DWDM port and the data transmitted over time from the router ports. In an example embodiment, the port identification server may perform a regression for each router port between the data received over time at the DWDM port and the data transmitted over time by the particular router port.

The port identification server uses the identification of the closeness of fit or matching for data received over time at each router port and the closeness of fit or matching for data transmitted over time from each router port to determine which of the router ports most likely is connected to the particular DWDM port. In an example scenario where a regression is used to determine the closeness of fit or matching between each of the ports and the DWDM port, the port identification server may, for each router port, generate a composite or aggregate value reflecting both identifications of closeness of fit or matching. The port identification server may add the result of the regression for data received at the router port to the result of the regression for data transmitted by the particular router port in order to generate a composite value. In an example embodiment, the port identification server identifies the router port with the largest composite value as the port to which the DWDM port is most likely connected.

Once a router port is identified as likely corresponding to a DWDM port, the port identification server may evaluate the confidence of the match. For example, the port identification server may compare the total data traffic through the DWDM port during a period of time with the total traffic through the identified router port during the same period of time. If the port identification server determines that the difference between the total traffic throughputs is relatively small, the port identification server confirms the selection of the particular router port. However, if the port identification server determines the difference between the total traffic throughputs exceeds a desired threshold, the port identification server may take action to arrive at a result that has a greater degree of confidence associated therewith. For example, the port identification server may perform the processing again, but may use a different set of data regarding data received at and sent from the various ports. In an example scenario, port identification server may perform the processing using data for a longer period of time (e.g., data received across 10 hours as opposed 5 hours), or may perform the processing using data from a different portion of the day (e.g., from 6 PM until 12 AM as opposed to from 6 AM until 12 PM).

While an example embodiment disclosed herein refer to matching ports of DWDM devices with ports of router devices, the disclosed systems and methods may be applied to any type of communication or networking devices that are interconnected. For example, the disclosed systems and methods apply to identifying interconnections between OSI layer devices, between OSI layer 2 devices, between layer 1 and layer devices, etc. Further, while an example embodiment discloses comparing data transmitted over time at communication ports, any suitable performance monitoring data or performance metric that can be reported for a time period may be compared as between networking devices. For example, data reflecting errors that occurred over time at networking devices may be compared for purposes of identifying connected networking devices. Similarly, data reflecting packet sizes that occur over time at networking devices may be compared for purposes of identifying connected networking devices.

Example Networking Environment

FIG. 1 is a diagram illustrating an example networking system 110 in which port identification processing may be performed. In the example system 110, three computing installations 120, 122, and 124 are shown. Each of computing installations 120, 122, 124 comprises one or more DWDM devices 140 which may be, for example, transponder devices, that are adapted to communicate data between installations via fiber links 142.

Each of DWDM devices 140 are communicatively coupled to one or more routers 150 via fiber connections 152. In an example embodiment, DWDM devices 140 receive multiplexed data via fiber connections 142, demultiplex the data, and communicate the data via a designated port to a router 150 attached thereto via connection 152. It will be appreciated that while in the example embodiment, DWDM devices 140 are illustrated as being connected to routers 150, any type of suitable networking devices may be communicatively coupled to DWDM devices 140 and the process of identifying a connected port as described herein may be applied to such devices.

Routers 150 are communicatively coupled via networks 160 with computing resources 170. Computing resources 170 may be any type of suitable computing service or device. For example, each of computing resources 170 may be a computing server that provides a Web-based service. It will be appreciated that while FIG. 1 depicts a single router 150 between DWDM devices 140 and systems 170, numerous levels of routers 150 may be positioned in the communication path between a DWDM device 140 and computing resources 170.

Each of DWDM devices 140 comprises a plurality of ports. Likewise, each of routers 150 comprise a plurality of ports. As noted above, existing DWDM systems 140 lack the capability to identify which router port is connected to each of its own ports. Port identification server 180 is adapted to communicate with DWDM devices 140 and routers 150 to collect data regarding data sent and received over each of the ports of each of the devices. As shown in FIG. 1, port identification server 180 may communicate over network 190 with access servers 192 to collect the same data for installations 122 and 124. Port identification server 180 aggregates the data over time and uses the aggregated data to identify from the patterns of the data sent and received at the ports which router ports correspond to which ports of the DWDM devices 140.

It will be appreciated that while in the example embodiment of FIG. 1, particular types of networking devices, e.g., DWDM devices and layer 2 routers, are described and used throughout to discuss various concepts, the concepts are not limited to particular types of networking devices are systems. Rather, the concepts disclosed herein apply to identifying connections between any suitable communication ports of any suitable networking devices.

Figure 2:
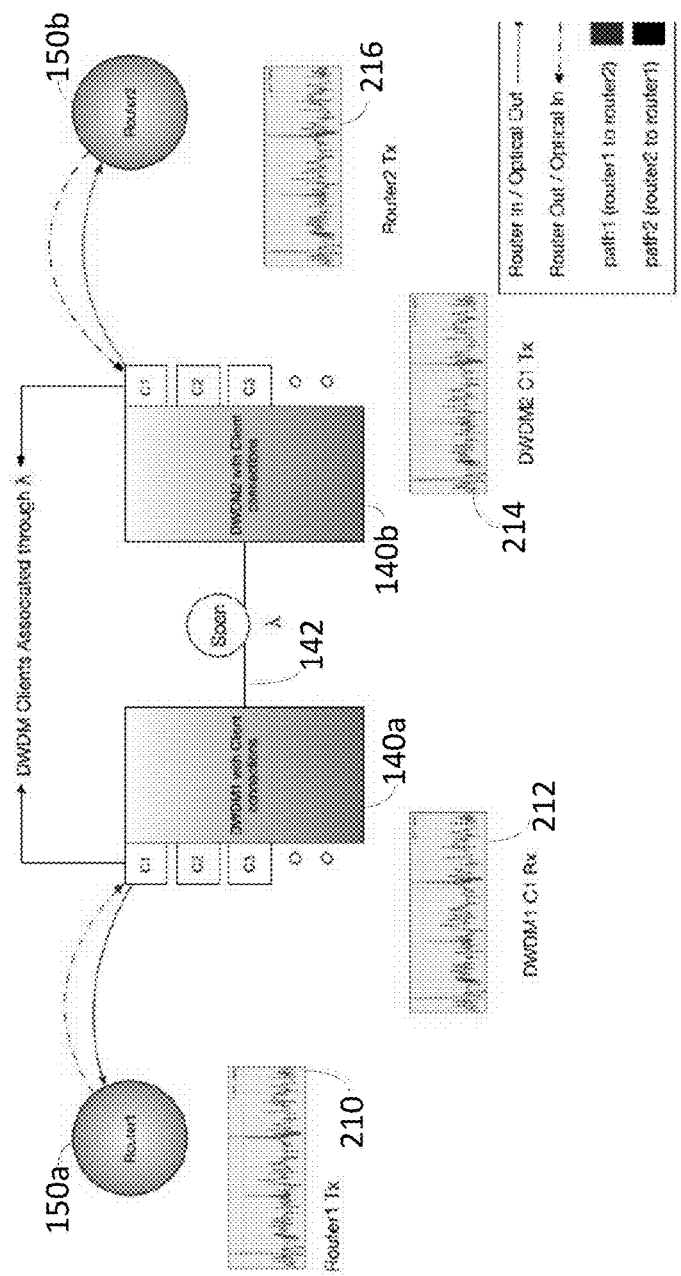
FIG. 2 depicts example interconnected networking devices.

FIG. 2 illustrates the concept of identifying connected networking device ports using the data transmitted from and received at the ports. As shown, two DWDM devices 140*a* and 140*b* are communicatively coupled via communication connection 142. DWDM device 140*a* comprises multiple client ports including ports C1, C2, and C3. In the example embodiment, router 150*a* is communicatively coupled with port C1 of DWDM device 140*a*. DWDM device 140*a* both sends data (represented by solid line) and receives data (represented by dashed line) via port C1.

DWDM device 140*b* similarly comprises multiple client ports including ports C1, C2, and C3. In the example embodiment, router 150*b* is communicatively coupled with port C1 of DWDM device 140*b*. DWDM device 140*b* both sends data (represented by solid line) and receives (represented by dashed line) data via port C1.

The data transmitted by router 150*a* to port C1 over a period of time generates a particular pattern as shown by graph 210. When the data received at port C1 of DWDM 140*a* is aggregated over time, it generates a pattern 212 that is the same as or very similar to pattern 210 of the data that was transmitted by router 150*a*.

DWDM device 140*a* communicates the data over link 142 to DWDM device 140*b*. After demultiplexing the data from other data that was transmitted over link 142, DWDM device 140*b* transmits the received data via port C1. The transmitted data, when accumulated over time, generates a pattern 214 that is the same or similar to the pattern of the data as it was received by DWDM device 140*a*, as depicted by graph 212, which is the same or similar to the pattern of data that was initially communicated by router 150*a* as depicted in graph 210.

The data transmitted by DWDM 140*b* via port C1 is received at router 150*b*. When the data received at router 150*b* is accumulated over time, the pattern generated as illustrated by pattern 216 is the same as or similar to the pattern of the data as it was transmitted by DWDM device 140*b*.

Accordingly, the same or similar pattern of data communicated over time exists at each networking device in the communication path. The systems and methods disclosed herein leverage this characteristic in order to identify connections between ports of DWDM devices and ports of router devices. Ports that have the same or similar time series of data received and transmitted are identified as being connected.

Figure 3:
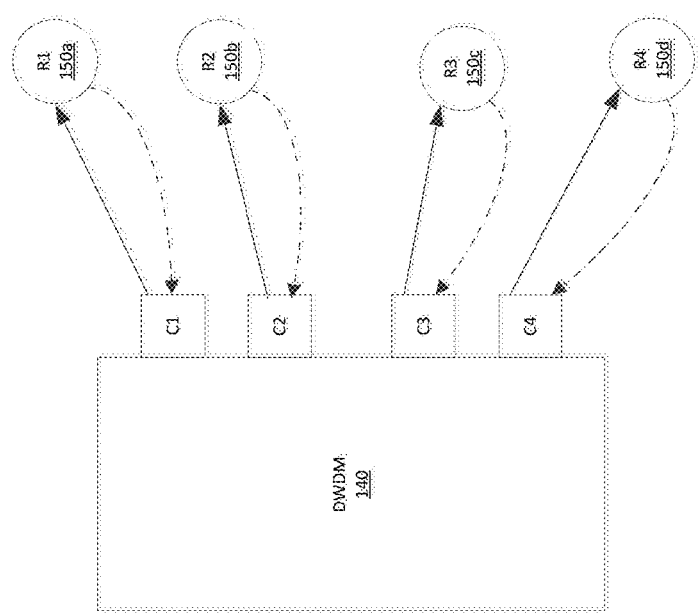
FIG. 3 depicts an example DWDM networking device communicatively coupled to corresponding router devices.

FIG. 3 depicts an example DWDM device 140 with four communication ports C1, C2, C3, and C4. Each communication port is connected to a corresponding port of a router 150. As depicted, DWDM port C1 is communicatively coupled with router R1. DWDM port C2 is communicatively coupled with router R2. DWDM port C3 is communicatively coupled with router R3. DWDM port C4 is communicatively coupled with router R4. As illustrated by the solid lines extending from the DWDM ports C1, C2, C3, and C4, data is communicated by the DWDM via each port to the corresponding port of the attached router. Also, and as illustrated by the dotted lines extending from the routers to the DWDM ports, data is transmitted by the router ports and received at the ports of the DWDM.

The data transmitted from and the data received into each of the DWDM ports provides a basis for identifying the router port to which each DWDM port is connected. By collecting the data transmitted and received at each port of the DWDM device 140, two data sets are created with which to identify a corresponding router and router port. For example, the data transmitted over time by DWDM port C1 may be compared with the data received over time at each of the ports of each of routers R1, R2, R3, and R4. The one router port which received data over time that most closely matches the data transmitted by the DWDM port C1, is likely attached to the port C1. Additionally, the data received over time at DWDM port C1 may be compared to the data transmitted over time by each of the ports of routers R1, R2, R3, and R4. The router port which transmitted over time data most closely matching the data received over time at DWDM port C1 is likely the port to which the DWDM port C1 is attached. Either of these comparisons by itself provides a basis for identifying a router port corresponding to a port of the DWDM device. According to an aspect of the disclosed embodiments, the results of both sets of comparisons (i.e., data transmitted by the DWDM device and data received at the DWDM device) may be used to identify the one router port that is most likely to be attached to the particular DWDM port. For example, the results of both sets of comparisons may be aggregated to identify the one port that most likely matches the DWDM port.

Figure 4:
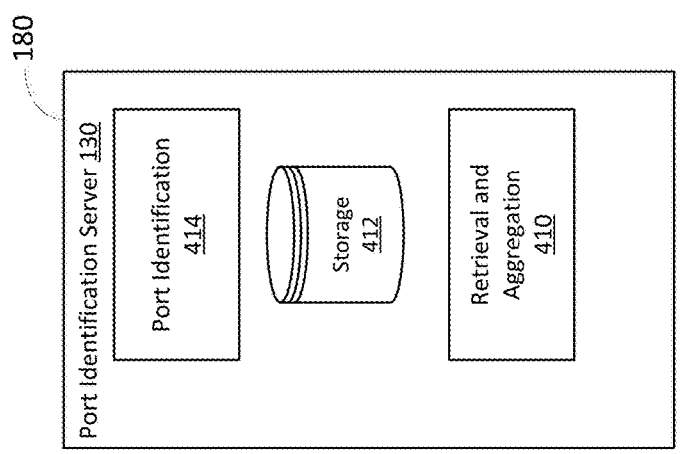
FIG. 4 depicts example functional components of a communications port identification server.

FIG. 4 depicts functional components of an example port identification server 180. As shown, port identification server 180 comprises retrieval and aggregation function 410 which retrieves time dependent throughput data from the networking devices 140, 150 that are to be analyzed. For example, retrieval and aggregation function 410 may retrieve data specifying data sent and received over time for each port of each relevant networking device.

Port identification server 180 comprises storage function 412 that operates to store the data that the server retrieves and aggregates. Storage function 412 also provides for retrieving the stored data as needed to support processing of the data. In an example embodiment, storage function 412 may be implemented using a database management system.

Port identification function 414 processes the aggregated data in order to identify the router ports that correspond to particular DWDM device ports. Port identification function 414 compares the data sent and data received over time at a DWDM port with the data received and sent over time by each of a plurality of router ports. The router port that sent and received data most closely matching the data received and sent by the DWDM port is identified as being the corresponding port.

Example Port Identification Processing

Figure 5:
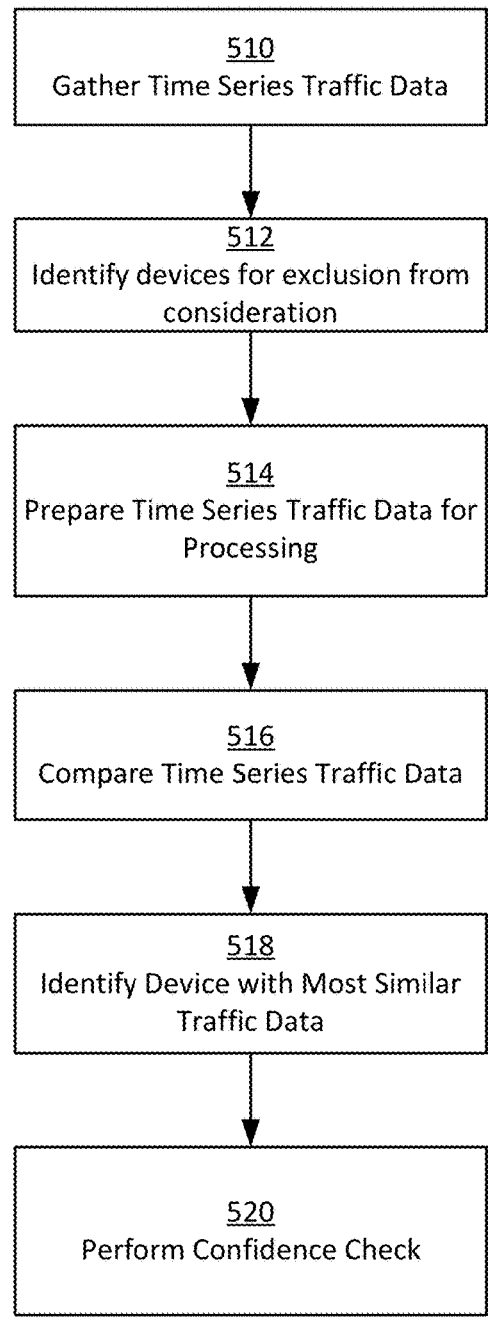
FIG. 5 depicts a flow diagram of an example process for identifying a router communication port corresponding to an optical communication port.

FIG. 5 is a diagram depicting example processing performed by port identification server 180 in identifying the particular router port that is connected to a particular DWDM port. As shown, at block 510, port identification server 180 gathers time series data reflecting data received and transmitted over time by ports of networking devices. In an example embodiment such as depicted in FIG. 1, port identification sever 180 communicates with systems at one or more of computer installations 120, 122, and 124 to collect data specifying data traffic transmitted and received over time on each port of each DWDM device 140 and each port of each router 150. The data may be retrieved from each individual device or from a system at the particular site that is responsible for polling the networking devices at the site.

The retrieved data comprises data specifying for each port on each relevant device, the data traffic received at the port during a particular time period and the data traffic out of the port during a particular time period. In an example embodiment, the amount of data that is sent/received at any particular moment or period of time is measured in bytes, kilobytes, megabytes, gigabytes, or some other unit based upon bytes. The retrieved data comprises information specifying the date and time each unit of data was sent and received by each of the ports. In addition, data regarding related characteristics of the ports such as traffic utilization and power levels may also be collected.

Port identification server 180 may periodically gather the data so as to accumulate data reflecting the bytes received into and transmitted from each port over a period of time. Such time dependent data may be referred to as a time series data, which in this instance reflects data transmitted or received over time. Any suitable duration reflecting data received and transmitted over time may be accumulated and used in the processing described herein. For example, data reflecting received and transmitted data over a 10 hour period or longer may be accumulated.

At block 512, port identification server 180 identifies any networking devices that may be excluded from consideration. In a typical scenario, port identification server 180 may be interested in knowing the router port connected to a particular port of a DWDM device. In such a scenario, port server may be able to exclude ports from consideration for any number of reasons. For example, in some instances, it may be possible to exclude router ports based upon location of the port. In an example scenario, port identification server 180 may exclude from consideration routers that are not located at computer installation 120 where the DWDM device of interest is located. If the particular installation 120 is sufficiently large, port identification server 180 may exclude routers based upon their position within the installation.

Port identification server 180 may exclude devices based upon rough evaluations of the data received at the ports. For example, port identification server 180 may determine that the particular port of the DWDM device for which it is desired to identify a corresponding router port may have an average data throughput of a particular size. In an example scenario, the DWDM port may have an average throughput (data received, data transmitted, or both) of 10 gigabytes per minute. Port identification server 180 may exclude routers ports that have an average throughput significantly different than the throughput of the DWDM port.

At block 514, port identification server 180 prepares for comparison the accumulated data for the ports that have not been excluded. In an example embodiment, port identification server 180, where necessary, may convert the accumulated data to a standard or common time frame so that the data from different networking devices, which may have used different time standards, may be compared. For example, port identification server 180 may convert the data to reflect Epoch time or some other suitable standard system for measuring time.

Port identification server 180 may, as needed, sample the accumulated data for ports so as to be consistent with the samplings accumulated for other ports. Different networking devices may collect data at different rates. For example, a DWDM device 140, which may be, for example, a transponder, may have recorded port traffic data every 30 seconds. Meanwhile, a router may have sampled the traffic into and out of every port every 60 seconds. Port identification server 180 may sample the data collected for the DWDM device so that it is consistent with the sampling rate of the router device. The port identification server 180 samples the data so as to account for different collection rates.

Port identification server 180 may store the prepared data items in data structures so as to facilitate comparison. For example, port identification server 180 may store the data throughput value for each recorded point in time in a separate element of an array. A single array may have stored there in the entire record of data transmitted or received at a port over defined period of time. Port identification server 180 may store the formatted data in any suitable manner including, for example, a relational database.

At block 516, port identification server 180 compares the prepared time series traffic data for a particular port of a DWDM device 140 with the prepared data for ports of the router devices 150 in order to determine which one of the router ports has data transmitted therefrom and received thereat that best fits or corresponds to the data received at and sent from the DWDM port. In an example scenario corresponding to a networking architecture such as is disclosed in FIG. 3, port identification server 180 may compare the data sent and received at DWDM port C1 with the data received and sent from each of the ports of each of routers 150*a-d*.

Port identification server 180 may first perform a comparison of the data sent from the DWDM port and data received at the various router ports. In other words, port identification server 180 evaluates the fit between data traffic sent over time from the DWDM port and the data received over time at each of the router ports being considered. The port identification server generates for each router port an identification of the closeness of fit or closeness of matching between the data sent from the DWDM port and the data received at the particular router port. In the context of an example networking architecture such as is depicted in FIG. 3, port identification server 180 compares the data transmitted over time by DWDM port C1 with the data received over time at each of the ports of each of routers 150*a-d*. In an example scenario, port identification server 180 compares the data transmitted over time by DWDM port C1 with the data received over time at router port 150*a*, as well as with the data received over time at router port 150*b*.

The comparison may comprise any suitable processing needed to determine how well the time series data from the DWDM port matches, correlates with, or fits data received at each of the ports of each router being considered. Any suitable statistical function may be used in comparing the time series of data. In an example embodiment, the port identification server 180 may perform a regression analysis for each router port between the data transmitted from the DWDM port and the data received by the particular router port. Any suitable correlation or regression analysis may be used, such as, for example, a linear regression. In an example scenario, the port identification server 180 may calculate the Pearson product-moment correlation coefficient, which is also known as the coefficient of determination and sometimes referred to as R squared or $R^2$, which is a number that indicates how well data fits or matches a statistical model, or in this instance, another set of data. The $R^2$ value is typically a fraction between 0.0 and 1.0 and has no units. An $R^2$ value of 0.0 means that there no linear relationship between the two data sets. An $R^2$ value of 1.0 indicates that all points lie exactly on the designated line with no scatter. Accordingly, port identification server 180 may calculate an $R^2$ value for each router port for the data transmitted from the DWDM port and the data received by the particular router port. In an example scenario, port identification server 180 may calculate a first $R^2$ value for the data transmitted from the DWDM port and the data received by router port 150*a*, and a second $R^2$ value for the data transmitted from the DWDM port and the data received by router port 150*b*.

Port identification server 180, by its comparison processing, or its evaluation of fit identifies for each router port an indication of closeness of fit or closeness of matching between the data received at the particular router port and the data transmitted from the DWDM port. In an example embodiment where port identification server 180 identifies an $R^2$ value for each router port, the particular port with the highest $R^2$ value is, based on the comparison, the router port most likely connected to the DWDM port. For example, in a scenario where port identification server 180 generated a first $R^2$ value for router port 150*a* and a second $R^2$ value for router port 150*b*, and the first $R^2$ value is greater than the second $R^2$ value, port identification server 180 may determine that port 150*a* is likely connected to the DWDM port.

In an example embodiment, port identification sever 180 takes advantage of the second data path at the DWDM port, i.e., the data received, to provide an additional indication of the router port likely attached to the particular DWDM port. Port identification server 180 compares the data received over time at the DWDM port with data sent over time from the various router ports. In other words, port identification server 180 evaluates the fit between data traffic received over time at the DWDM port and the data transmitted over time from each of the router ports being considered. Port identification server 180 generates for each router port an identification of the closeness of fit or closeness of matching between the data received at the DWDM port and the data transmitted from the router ports. In an example embodiment, port identification server 180 may perform a regression for each router port between the data received at the DWDM port and the data transmitted by the particular router port. In the context of an example networking architecture such as is depicted in FIG. 3, port identification server 180 compares the data received over time by DWDM port C1 with the data transmitted over time by each of the ports of each of routers 150*a-d*. In an example scenario, port identification server 180 compares the data received over time by DWDM port C1 with the data transmitted by router port 150*a*, as well as with the data transmitted over time at router port 150*b*.

The comparison may comprise any suitable processing needed to determine how well the time series data received at the DWDM port matches or fits data transmitted from each of the ports of each of router being considered. Any suitable statistical function may be used in comparing the time series of data. In an example embodiment, the port identification server 180 may perform a regression analysis for each router port between the data received at the DWDM port and the data transmitted from the particular router port. In an example scenario, the port identification server 180 may calculate the coefficient of determination, $R^2$. In such an embodiment, port identification server 180 calculates an $R^2$ value for each router port as a comparison of the data received at the DWDM port and the data transmitted by the particular router port. As noted above, the $R^2$ value for each comparison may be a value between 0.0 and 1.0 and represent the closeness of fit or matching between the data received at the DWDM port and the data transmitted by the particular router port. The comparison that yields the highest number closest to 1.0 identifies the router port that, based on the data sent from the router ports, is likely the router port connected to the DWDM port. In the example scenario where identification server 180 is evaluating router ports 150*a* and 150*b*, port identification server 180 calculates an $R^2$ value for the data received at the DWDM port and the data transmitted from router port 150*a*, and an $R^2$ value for the data transmitted from the DWDM port and the data received by router port 150*b*. The particular port with the highest $R^2$ value is, based on the comparison, the router port most likely connected to the DWDM port. For example, in a scenario where port identification server 180 generated a first $R^2$ value for router port 150*a* and a second $R^2$ value for router port 150*b*, and the first $R^2$ value is greater than the second $R^2$ value, port identification server 180 may determine that port 150*a* is connected to the DWDM port.

While either the comparison of data flows sent from the DWDM device or the comparison of data flows received at the DWDM device by themselves provide a basis for evaluating which router port is connected to the DWDM device, according to an aspect of the disclosed embodiments, the results of both sets of comparisons may be aggregated to provide an even more informed evaluation of the likely attached router port. At block 518, port identification server 180 uses the identification of the closeness of fit or matching for data received at each router port and the closeness of fit or matching for data transmitted from each router port to determine which of the router ports has the most similar time series traffic data and, therefore, is most likely connected to the particular DWDM port. In an example embodiment, port identification server may generate for each router port an aggregate or composite value reflecting the closeness of fits for both data sent and received by the particular router port. In an example scenario where a regression is used to determine the closeness of fit between each of the ports and the DWDM port, the port identification server may, for each router port, add the result of the regression for data received at the router port with the result of the regression for data transmitted by the particular router port to generate a composite value. Where an $R^2$ value was calculated for each port for each of data transmitted from and received at a particular port, port identification server 180 may add the two $R^2$ values to form a composite indication of the closeness of fit between data throughput of the particular router port and the DWDM port. In the example scenario wherein port identification server 180 generated a first $R^2$ value for router port 150*a* corresponding to data sent from router port 150*a* and a second $R^2$ value corresponding to data received at router port 150*a*, port identification server may add the first and second $R^2$ values to obtain a composite $R^2$ value for router port 150*a*. Similarly, wherein port identification server 180 generated a first $R^2$ value for router port 150*b* corresponding to data sent from router port 150*b* and a second $R^2$ value corresponding to data received at router port 150*b*, port identification server may add the first and second $R^2$ values to obtain a composite $R^2$ value for router port 150*b*.

Port identification server 180 uses the generated closeness of fit value, which may be the composite value, to identify the router port with the most similar time series data traffic to the DWDM port, and, therefore, the port most likely to be connected to the DWDM port. In an embodiment where regression was used to evaluate closeness of fit and the results of the regression added, port identification server 180 identifies the router port with the largest composite value as the port to which the DWDM port is most likely connected. In the particular example embodiment where an $R^2$ value was calculated for each port for each of data transmitted from and received at a particular port and the $R^2$ values were added to form a composite value, port identification server 180 identifies the router port with the largest combined $R^2$ value as corresponding to the DWDM port. In an example scenario wherein port identification server 180 generated a composite $R^2$ value for router port 150*a* and a composite $R^2$ value corresponding to router port 150*b*, and the $R^2$ value for router port 150*a* is greater than the composite $R^2$ value for router port 150*b*, port identification server 180 identifies router port 150*a* as being connected to the DWDM port Once a router port is identified as likely corresponding to a DWDM port, at block 520, port identification server 180 may evaluate the confidence of the match. For example, port identification server 180 may compare the mean bytes per defined period, e.g., 2 minutes, through the DWDM port with the mean bytes per defined period through the identified router port. In the example scenario wherein router port 150*a* was identified, port identification server 180 may compare the mean bytes per minute through router port 150*a* with the mean bytes per minute through the DWDM port. If port identification server 180 determines that the difference between the mean byte through put is an acceptably small value, port identification server 180 confirms the selection of the particular router port. If the difference between mean throughputs is unacceptably large, port identification server 180 determines further processing is required.

In another example embodiment wherein a composite $R^2$ value was calculated to identify the corresponding router port, port identification server 180 may determine whether the combined value exceeds a threshold. For example, port identification server 180 may determine whether the composite value is 0.6 or greater. If so, port identification server 180 confirms the selection of the particular router port. If the composite value is less than 0.6, port identification server 180 determines further processing may be required.

In yet another example embodiment, port identification server 180 may compare the composite $R^2$ value of the identified router port with the next highest composite $R^2$ value. If the difference is an acceptably large value, port identification server 180 may confirm that the selection of the particular router port. However, if the difference is not acceptably significant, port identification server 180 determines further processing may be required.

Where port identification server 180 determines further processing is required, port identification server 180 may aggregate additional throughput data over a longer period of time. For example, if the port identification server determines the difference between the total traffic throughputs exceeds a desired threshold, the port identification server may take action to arrive at a result that has a greater degree of confidence associated therewith. For example, port identification server may perform the processing again, but may use a different set of data regarding data received at and sent from the various ports. In an example scenario, port identification server may perform the processing using data for a longer period of time (e.g., data received across 10 hours as opposed 5 hours), or may perform the processing using data from a different portion of the day (e.g., from 6 PM until 12 AM as opposed to from 6 AM until 12 PM). Once the additional data is accumulated, port identification server 180 may reevaluate the ports.

Upon completion of the processing, port identification server 180 stores the results of its processing, including identification of ports that were determined to be connected. The data may be stored in any suitable manner including, for example, in a database from which the data may be retrieved. The stored data may be combined with other data to generate reports identifying relationships between ports of networking devices. The reports may provide a snapshot of the network configuration. The records of interconnections between networking equipment may be used, for example, to provide a history of the state of the networking equipment at particular points in time. The records provide a type of change control.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 6:
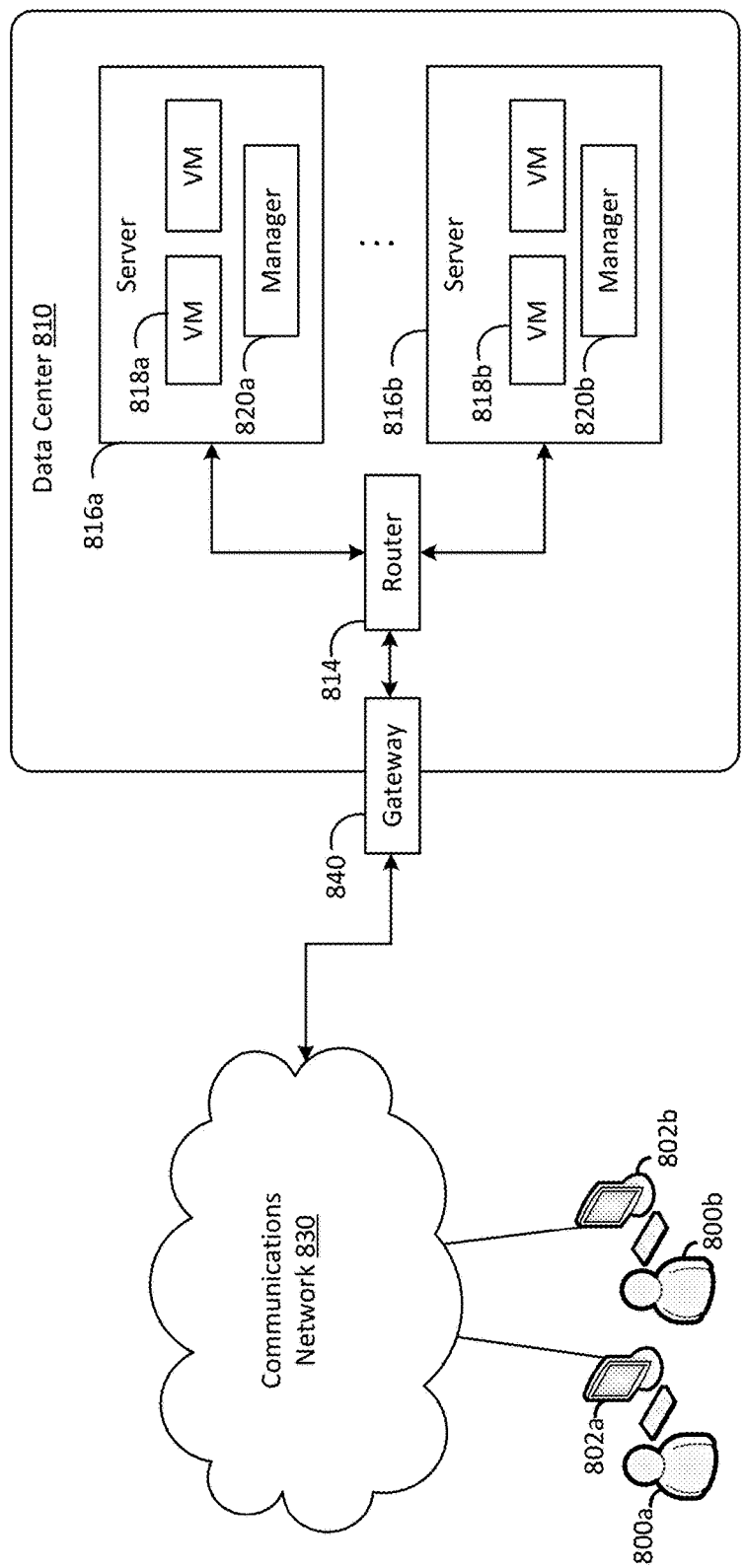
FIG. 6 depicts an example computing system that may be used in some embodiments.

FIG. 6 illustrates an example computing environment in which the embodiments described herein may be implemented. FIG. 6 is a diagram schematically illustrating an example of a data center 810 that can provide computing resources to users 800a and 800b (which may be referred herein singularly as "a user 800" or in the plural as "the users 800") via user computers 802a and 802b (which may be referred herein singularly as "a computer 802" or in the plural as "the computers 802") via a communications network 830. Data center 810 may be configured to provide computing resources for executing applications on a permanent or an as-needed basis. The computing resources provided by data center 810 may include various types of resources, such as data processing resources, data storage resources, data communication resources, and the like. Each type of computing resource may be general purpose or may be available in a number of specific configurations. For example, data processing resources may be available as virtual machine instances. The instances may be configured to execute applications, including email servers, web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as web servers and/or one large processing resource as a database server, for example.

Data center 810 may include servers 816a and 816b (which may be referred herein singularly as "a server 816" or in the plural as "the servers 816") that provide computing resources available as virtual machine instances 818a and 818b (which may be referred herein singularly as "a virtual machine instance 818" or in the plural as "the virtual machine instances 818"). The virtual machine instances 818 may be configured to execute applications, including Web servers, application servers, media servers, database servers, and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies, such as those provided by VMware or other virtualization systems, may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 6, communications network 830 may, for example, be a publicly accessible network of linked networks and possibly operated by various distinct parties, such as the Internet. In other embodiments, communications network 830 may be a private network, such as, for example, a corporate or university network that is wholly or partially inaccessible to non-privileged users. In still other embodiments, communications network 830 may include one or more private networks with access to and/or from the Internet.

Communications network 830 may provide access to computers 802. Computers 802 may be computers utilized by customers 800 or other customers of data center 810. For instance, user computer 802a or 802b may be a server, a desktop or laptop personal computer, a tablet computer, a wireless telephone, a personal digital assistant (PDA), an e-book reader, a game console, a set-top box, or any other computing device capable of accessing data center 810. User computer 802a or 802b may connect directly to the Internet (e.g., via a cable modem or a Digital Subscriber Line (DSL)). Although only two user computers 802a and 802b are depicted, it should be appreciated that there may be multiple user computers.

Computers 802 may also be utilized to configure aspects of the computing resources provided by data center 810. In this regard, data center 810 might provide a Web interface through which aspects of its operation may be configured through the use of a Web browser application program executing on user computer 802. Alternatively, a stand-alone application program executing on user computer 802 might access an application programming interface (API) exposed by data center 810 for performing the configuration operations. Other mechanisms for configuring the operation of the data center 810, including deploying updates to an application, might also be utilized.

Servers 816a and 816b (which may be referred herein singularly as "a server 816" or in the plural as "the servers 816") shown in FIG. 6 may be standard servers configured appropriately for providing the computing resources described above and may provide computing resources for executing one or more applications. In one embodiment, the computing resources may be virtual machine instances 818. In the example of virtual machine instances, each of the servers 816 may be configured to execute an instance manager 820a or 820b (which may be referred herein singularly as "an instance manager 820" or in the plural as "the instance managers 820") capable of executing the virtual machine instances. The instance managers 820 may be a virtual machine monitor (VMM) or another type of program configured to enable the execution of virtual machine instances 818 on servers 816, for example. As discussed above, each of the virtual machine instances 818 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 810 shown in FIG. 6, a router 814 may be utilized to interconnect the servers 816*a* and 816*b*. Router 814 may also be connected to gateway 240, which is connected to communications network 830. Router 814 may manage communications within networks in data center 810, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 810 described in FIG. 6 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 810 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 810 can be scaled on-demand.

Auto scaling is one mechanism for scaling computing resources in response to increases or lulls in demand for the resources. Auto scaling allows customers of data center 810 to configure data center 810 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 810.

Data center 810 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts, and/or other types of code to be executed in new instances, provide cache warming logic specifying how an application cache should be prepared, and other types of information. The deployment component utilizes the customer-provided configuration and cache warming logic to launch, configure, and prime new instances of computing resources.

Figure 7:
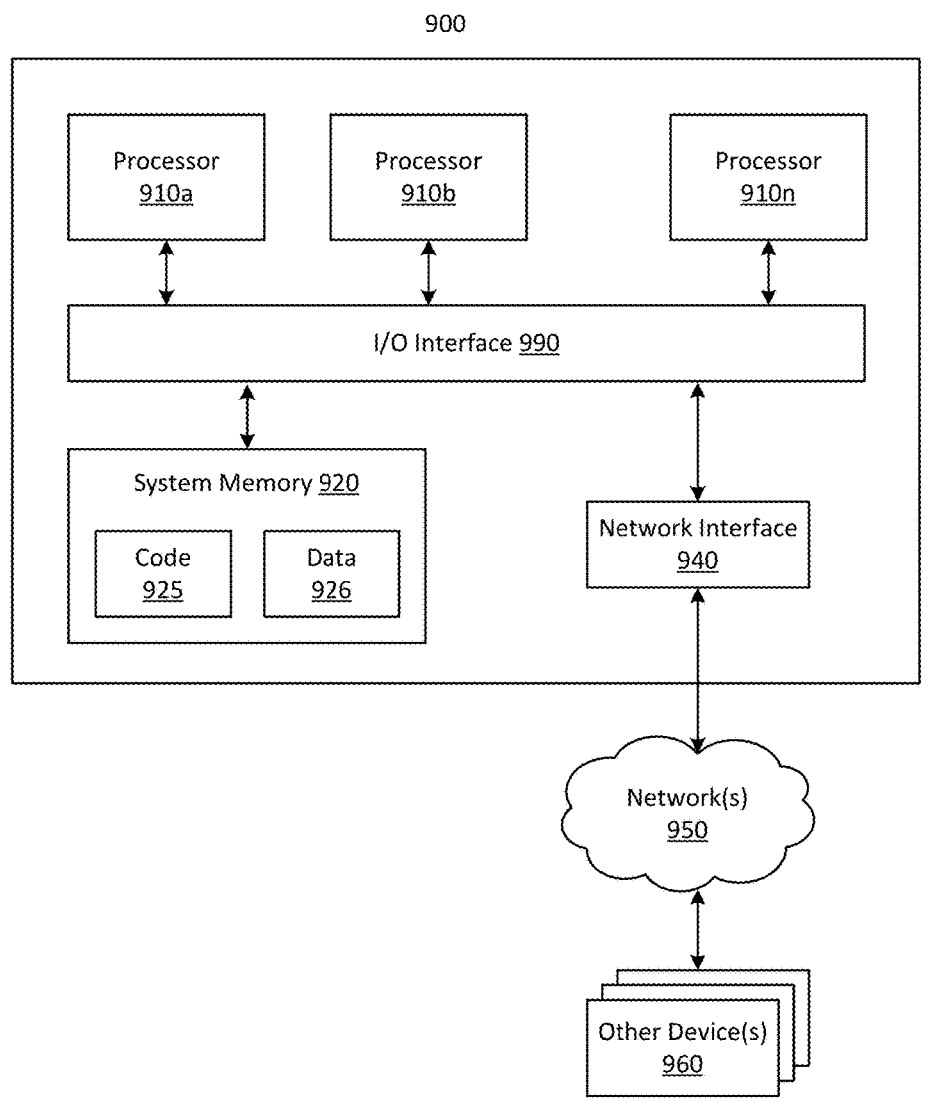
FIG. 7 depicts an example computing system that may be used in some embodiments.

In at least some embodiments, a server or other computing device that implements a portion or all of one or more of the technologies described herein, including the techniques to implement the functionality described herein in reference to port identification server 180 and servers 192 may include a general purpose computer system that includes or is configured to access one or more computer-accessible media. FIG. 7 illustrates such a general purpose computing device 900. In the illustrated embodiment, computing device 900 includes one or more processors 910*a*, 910*b*, and/or 910*n* (which may be referred herein singularly as "a processor 910" or in the plural as "the processors 910") coupled to a system memory 920 via an input/output (I/O) interface 990. Computing device 900 further includes a network interface 940 coupled to I/O interface 990.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 990 may be configured to coordinate I/O traffic between processor 910, system memory 920, and any peripheral devices in the device, including network interface 940 or other peripheral interfaces. In some embodiments, I/O interface 990 may perform any necessary protocol, timing, or other data transformations to convert data signals from one component (e.g., system memory 920) into a format suitable for use by another component (e.g., processor 910). In some embodiments, I/O interface 990 may include support for devices attached through various types of peripheral buses, such as a variant of the Peripheral Component Interconnect (PCI) bus standard or the Universal Serial Bus (USB) standard, for example. In some embodiments, the function of I/O interface 990 may be split into two or more separate components, such as a north bridge and a south bridge, for example. Also, in some embodiments some or all of the functionality of I/O interface 990, such as an interface to system memory 920, may be incorporated directly into processor 910.

Network interface 940 may be configured to allow data to be exchanged between computing device 900 and other device or devices 960 attached to a network or network(s) 950, such as other computer systems or devices as illustrated in FIGS. 1 through 7, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fibre Channel SANs or via any other suitable type of network and/or protocol.

In some embodiments, system memory 920 may be one embodiment of a computer-accessible medium configured to store program instructions and data as described above in connection with FIGS. 1-5 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 900 via I/O interface 990. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic or digital signals, conveyed via a communication medium such as a network and/or a wireless link, such as may be implemented via network interface 940. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones.

That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager and the pricing optimizer Such an interface may include capabilities to allow browsing of a resource catalog and details and specifications of the different types or sizes of resources supported and the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations, or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Accordingly, applicant has disclosed systems, methods, and computer readable media that are adapted for identifying connections between ports of devices. The disclosed systems and methods compare performance data for a time period associated with a first port with performance data for a time period associated with each of a plurality of other ports. In an example embodiment, the performance data is described as data transmitted and received at ports, although any suitable type of performance data such as error data and packet data may be used. By comparing the performance data at the various ports, the disclosed systems and methods identify the ports that are connected to each other. In an example embodiment, the disclosed systems and methods compare data sent from and received over time at a first port with data received at and sent over time from each port of other networking devices. The port that has inputs and outputs over time that most closely match or correspond to the outputs and inputs over time of the first port is identified as the port to which the first port is connected.

It will be appreciated that while illustrative embodiments have been disclosed, the scope of potential embodiments is not limited to those explicitly described. For example, while the concepts are described with reference to particular types of optical devices, e.g., DWDM devices, the envisioned embodiments extend to any devices including other types of optical devices. Likewise, while the concepts are described with reference to particular OSI layer 2 devices, e.g., routers, the envisioned embodiments extend to any suitable networking devices. Further, while particular statistical evaluations are noted in connection with determining closeness of fit, the envisioned embodiments extend to any suitable technique for comparing the closeness of fit between two data sets. Still further, while an example embodiment discloses comparing data transmitted over time at communication ports, any suitable performance monitoring data or performance metric that can be reported in a time period may be compared as between networking devices. For example, data reflecting errors that occurred over time at networking devices may be compared for purposes of identifying connected networking devices. Similarly, data reflecting packet sizes that occur over time at networking devices may be compared for purposes of identifying connected networking devices.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method to identify ports, comprising:

receiving for a first device time series data identifying data received at and data transmitted from a port of a plurality of ports of the first device;

receiving for each of a plurality of second devices time series data identifying data received at and data transmitted from at least one port of each of the plurality of second devices;

comparing the time series data identifying data received at the port of the plurality of ports of the first device with the time series data identifying data transmitted from each of the at least one port of each of the plurality of second devices;

generating, for each of the at least one port of each of the plurality of second devices, a first respective indication of closeness of matching, comprising an indication of closeness of matching between data received at the port of the plurality of ports of the first device and data transmitted from the at least one port;

comparing the time series data identifying data transmitted from the port of the plurality of ports of the first device with the time series data identifying data received at each of the at least one port of each of the plurality of second devices;

generating, for each of the at least one port of each of the plurality of second devices, a second respective indication of closeness of matching, comprising an indication of closeness of matching between data transmitted from the port of the plurality of ports of the first device and data received at the at least one port; and identifying one port of the plurality of second devices as being connected to the port of the plurality of ports of the first device using, for each of the at least one port of the plurality of second devices, the first respective indication of closeness of matching and the second respective indication of closeness of matching.

2. The computer-implemented method of claim 1, further comprising:

preparing for comparison the time series data identifying data received at and data transmitted from the port of the plurality of ports of the first device; and preparing for comparison the time series data identifying data received at and data transmitted from each of the at least one port of each of the plurality of second devices;

wherein preparing for comparison the time series data identifying data received at and data transmitted from the port of the plurality of ports of the first device comprises converting to a common time frame the time series data identifying data received at and data transmitted from the port of the plurality of ports of the first device, and wherein preparing for comparison the time series data identifying data received at and data transmitted from each of the at least one port of each of the plurality of second devices comprises converting to the common time frame the time series data identifying data received at and data transmitted from the port of the plurality of ports of the first device.

3. The computer-implemented method of claim 1, wherein generating, for each of the at least one port of the plurality of second devices, the first respective indication of closeness of matching comprises performing a regression analysis on data received at the port of the plurality of ports of the first device and data transmitted from the at least one port;

wherein generating, for each of the at least one port of the plurality of second devices, the second respective indication of closeness of matching comprises performing a regression analysis on data transmitted from the port of the plurality of ports of the first device and data received at the at least one port.

4. The computer-implemented method of claim 3, wherein performing a regression analysis on data received at the port of the plurality of ports of the first device and data transmitted from the at least one port comprises generating, for each port of each of the plurality of second devices, an $R^2$ value; and wherein performing a regression analysis on data received at the port of the plurality of ports of the first device and data transmitted from the at least one port comprises generating, for each port of each of the plurality of second devices, an $R^2$ value.

5. A computing system for identifying a connected communication port, comprising:

computing memory having stored therein computer instructions that, upon execution by one or more processors, cause at least the computing system to perform operations comprising:

evaluating fit between data over time associated with a first port of a plurality of ports of a first device and data over time associated with a second port of a second device;

evaluating fit between data over time associated with the first port and data over time associated with a third port of a third device;

determining that the fit between data over time associated with the first port and data over time associated with the second port is closer than the fit between data over time associated with the first port and data over time associated with the third port; and determining, based on the determining that the fit between data over time associated with the first port and data over time associated with the second port is closer than the fit between data over time associated with the first port and data over time associated with the third port, that the first port is connected to the second port.

6. The computing system of claim 5, wherein evaluating fit between data over time associated with a first port and data over time associated with a second port comprises: evaluating fit between data received at the first port and data transmitted from the second port; and wherein evaluating fit between data over time associated with the first port and data traffic over time associated with a third port comprises: evaluating fit between data received at the first port and data transmitted from the third port.

7. The computing system of claim 5, wherein evaluating fit between data over time associated with a first port and data over time associated with a second port comprises: evaluating fit between data transmitted from the first port and data received at the second port; and wherein evaluating fit between data over time associated with the first port and data over time associated with a third port comprises: evaluating fit between data transmitted from the first port and data received at the third port.

8. The computing system of claim 5, wherein evaluating fit between data over time at a first port and data over time at a second port, comprises:
evaluating fit between data received at the first port and data transmitted from the second port, and
evaluating fit between data transmitted from the first port and data received at the second port; and wherein evaluating fit between data over time associated with the first port and data over time at a third port, comprises:
evaluating fit between data received at the first port and data transmitted from the third port, and
evaluating fit between data transmitted from the first port and data received at the third port.

9. The computing system of claim 5, wherein evaluating fit between data over time associated with a first port and data over time associated with a second port comprises performing a regression analysis on data over time associated with the first port and data over time associated with the second port; and wherein evaluating fit between data over time associated with the first port and data over time associated with a third port comprises performing a regression analysis on data over time associated with the first port and data over time associated with the third port.

10. The computing system of claim 9, wherein performing a regression analysis on data over time associated with a first port and data over time associated with the second port comprises calculating an $R^2$ value; and wherein performing a regression analysis on data over time associated with the first port and data over time associated with the third port comprises calculating an $R^2$ value.

11. The computing system of claim 8, wherein evaluating fit between data received at the first port and data transmitted from the second port comprises generating a first value corresponding to fit between data received at the first port and data transmitted from the second port;

wherein evaluating fit between data transmitted from the first port and data received at the second port comprises generating a second value corresponding to fit between data transmitted from the first port and data received at the second port;

wherein evaluating fit between data received at the first port and data transmitted from the third port comprises generating a third value corresponding to fit between data received at the first port and data transmitted from the third port; and wherein evaluating fit between data transmitted from the first port and data received at the third port comprises generating a fourth value corresponding to fit between data transmitted from the first port and data received at the third port.

12. The computing system of claim 11, the operations further comprising:

generating a first composite value from the first value and the second value; and generating a second composite value from the third value and the fourth value, wherein determining that the fit between data over time associated with the first port and data over time associated with the second port is closer than the fit between the data over time associated with the first port and data over time associated with the third port comprises determining the first composite value is greater than the second composite value.

13. The computing system of claim 5, wherein evaluating fit between data over time associated with the first port and data over time associated with the second port comprises generating a first value corresponding to fit between data over time associated with the first port and data over time associated with the second port, wherein evaluating fit between data over time associated with the first port and data over time associated with the third port comprises generating a second value corresponding to fit between data over time associated with the first port and data over time associated with the third port, and wherein determining that the fit between data over time associated with the first port and data over time associated with the second port is closer than the fit between the data over time associated with the first port and the data over time associated with the third port comprises determining the first value is greater than the second value.

14. The computing system of claim 13, wherein generating a first value corresponding to fit between data traffic over time at the first port and data traffic over time at the second port comprises generating a first $R^2$ value;

wherein generating a second value corresponding to fit between data traffic over time at the first port and data traffic over time at the third port comprises generating a second $R^2$ value; and wherein determining the first value is greater than the second value comprises determining the first $R^2$ value is greater than the second $R^2$ value.

15. The computing system of claim 5, the operations further comprising:

comparing a mean throughput of data during a defined period at the first port to a mean throughput during the defined period of data at the second port; and upon determining that a difference between the mean throughput of data during a defined period at the first port and the mean throughput during the defined period of data at the second port is acceptably small, confirming that the first port is coupled to the second port.

16. A non-transitory computer-readable storage medium having stored thereon computer instructions that, upon execution by one or more processors, at least cause a computing system to perform operations comprising:

generating a first value indicating closeness of fit between data received over time at a first port and data transmitted over time from a second port;

generating a second value indicating closeness of fit between data transmitted over time from the first port and data received over time at the second port;

generating a third value indicating closeness of fit between data received over time at the first port and data transmitted over time from a third port;

generating a fourth value indicating closeness of fit between data transmitted over time from the first port and data received over time at the third port;

generating a first composite value from the first value and the second value;

generating a second composite value from the third value and the fourth value;

determining the first composite value indicates a closer fit than the second composite value; and identifying, based on determining the first composite value indicates a closer fit than the second composite value, the first port is communicatively coupled with the second port.

17. The non-transitory computer-readable medium of claim 16, wherein generating a first value indicating closeness of fit between data received over time at a first port and data transmitted over time from a second port comprises performing regression analysis on data received over time at the first port and the data transmitted over time from the second port;

wherein generating a second value indicating closeness of fit between data transmitted over time from the first port and data received over time at the second port comprises performing regression analysis on data transmitted over time from the first port and data received over time at the second port;

wherein generating a third value indicating closeness of fit between data received over time at the first port and data transmitted over time from a third port comprises performing regression analysis on data received over time at the first port and data transmitted over time from a third port; and wherein generating a fourth value indicating closeness of fit between data transmitted over time from the first port and data received over time at the third port comprises performing regression analysis on data transmitted over time from the first port and data received over time at the third port.

18. The non-transitory computer-readable medium of claim 17, wherein performing regression analysis on data received over time at the first port and the data transmitted over time from the second port comprises generating a first $R^2$ value;

wherein performing regression analysis on data transmitted over time from the first port and data received over time at the second port comprises generating a second $R^2$ value;

wherein performing regression analysis on data received over time at the first port and data transmitted over time from a third port comprises generating a third $R^2$ value; and wherein performing regression analysis on data transmitted over time from the first port and data received over time at the third port comprises generating a fourth $R^2$ value.

19. The non-transitory computer-readable medium of claim 16, wherein the first port is comprised in an optical networking device, wherein the second port is comprised in a layer 2 router, and wherein the third port is comprised in a layer 2 router.

20. The non-transitory computer-readable medium of claim 16, wherein the data received over time at the first port and the data transmitted over time from the first port is from a first period of a day, the operations further comprising:

determining the first composite value does not exceed a predetermined threshold; and generating new values for the first value, second value, third value, fourth value, first composite value, and second composite value using data received over time at the first port and data transmitted over time from the first port from a second period of the day.

* * * * *